106. COMPOSITIONS, COATING OR PLASTIC.

Examiner.

86

815,801

UNITED STATES PATENT OFFICE.

CHARLES M. DEPEW AND HOLLIS E. McCOY, OF SAN FRANCISCO, CALIFORNIA, ASSIGNORS TO PUMICE STONE CONSTRUCTION COMPANY, OF SAN FRANCISCO, CALIFORNIA.

BUILDING MATERIAL.

No. 815,801.  Specification of Letters Patent.  Patented March 20, 1906.

Application filed February 10, 1905. Serial No. 245,123.

*To all whom it may concern:*

Be it known that we, CHARLES M. DEPEW and HOLLIS E. McCOY, citizens of the United States, residing in the city and county of San Francisco and State of California, have invented new and useful Improvements in Building Material, of which the following is a specification.

Our invention relates to an improved article of manufacture for use in building construction, and pertains especially to a fireproof composition for tiling, slabs, flooring, and the like.

Our object is to provide a substitute for the ordinary concrete and artificial stone, especially where a maximum amount of strength and a minimum amount of weight is required.

Concrete is usually made from a suitable admixture of sand, gravel, broken rock, and cement. While possessing the desired strength, its excessive weight is greatly against its extensive use for flooring, ceilings, partitions, and the like in high buildings. We have discovered that certain products which exist in a natural state form an excellent substitute for the sand, gravel, and broken rock, and yet are very much lighter, and when mixed with a proper proportion of Portland cement or other suitable binder produce a composition of great economic value, as per accompanying specimen entitled "Exhibit A." These products are of volcanic origin and are found at least in certain localities along the western shores of the western hemisphere and particularly in the Sierra Nevada mountains of northern California. One of these products is a form of volcanic ash or pumice, occurring in more or less compacted and solid masses as distinguished from a powder or dust. Powdered pumice or pumice-powder or pumice-dust will not do, because it will not combine properly with the cement which is used as a binder in our composition and which cement is a powder itself. By "pumice" in the present connection and in our claims we mean a volcanic substance having a specific gravity of approximately 1.13 and found in a more or less compacted form and used in chunks or pieces varying in size, say, from that of a hickory-nut to a walnut. This pumice is designed to take the place of the broken rock of ordinary concrete. The analysis of pumice is as follows: silica, 70.62 per cent.; alumina, ($Al_2O_3$) 19.92 per cent.; iron oxid, ($Fe_2O_3$) 2.26 per cent.; alkalies, (soda and potash) 6.90 per cent. The other ingredient which is employed as a substitute for the sand and gravel of the ordinary concrete is characterized as an extremely light, hard, silicious, scoriaceous, non-chalky, non-dusting substance, being full of large cells and in appearance suggestive of a vitrified froth or foam and having a specific gravity of approximately 1.50. This scoria is pulverized to the size of the gravel and sand used in ordinary concrete and forms a filling for the interstices of the coarse granules or lumps of pumice. When ground, the scoria is dark and exceedingly sharp and resembles emery. Its analysis is as follows: silica, 70.33 per cent.; alumina, 26.95 per cent.; iron oxid, 2.58 per cent. The coarse pumice lumps and the pulverized scoria are mixed in suitable proportions with an appropriate binder, as Portland cement and water, to form our improved building material, which when allowed to set produces excellent qualities for floors, ceilings, walls, partitions, slabs, and wherever ordinary concrete could be of value, but where the use of the latter is inhibited by reason of its too great weight.

The proportions of the several ingredients vary somewhat according to the nature of the work for which the material is intended. Where extreme strength is required, the proportions of the several constituents, aside from the water to render the mixture sufficiently plastic, will be about as follows, to wit: two parts pumice-stone, nut size; one part volcanic scoria, pulverized; one part Portland cement or equivalent binder.

By "nut size" is meant the size of the broken rock used in ordinary concrete and which will generally pass through an inch and a half screen.

For work not requiring so much strength the proportion of cement may be reduced and that of the pulverized scoriaceous material increased, although it is not desirable for best results that the proportion of cement be less than one part of cement to six parts of pumice and scoria combined.

The material when in plastic condition may be molded or compressed by appropriate means into any suitable form, as tiles, bricks, slabs, panels, or may be used in bulk for flooring, partitions, and generally wherever it is now customary to use ordinary concrete, but where greater lightness in the supported structure is required or desirable.

In our concrete the crushed scoria takes the place of ordinary sand to form the mortar, and the pumice-stone takes the place of the ordinary broken rock and gravel, these ingredients, mixed with the proper portions of Portland cement for a light though semiporous mass, possessing a crushing strength exceeding that of ordinary concrete while weighing less than one-half. The great strength is attributed to the large proportion of alumina and the absence of chalky or dust-forming substances in the scoriaceous sand which enters into our mortar and forms the basis of our concrete.

Having thus described our invention, what we claim, and desire to secure by Letters Patent, is—

1. A building material consisting of pumice of volcanic origin and substantially of nut size and containing silica, alumina, iron oxid and alkalies in substantially the proportions described, scoria crushed to about the consistency of ordinary sand and containing about twenty-seven per cent. of alumina, and Portland cement.

2. A building material consisting of volcanic pumice of nut size and containing about twenty per cent. of alumina; scoria crushed to about the consistency of ordinary sand and containing about twenty-seven per cent. alumina and which when ground is of dark color, does not dust or powder, and has sharp edges and angular surfaces; and Portland cement.

3. A building material consisting of volcanic pumice of nut size containing silica and alumina in substantially the proportions described; scoria crushed to about the consistency of ordinary sand and containing silica and alumina in about the proportions specified, and Portland cement.

In testimony whereof we have hereunto set our hands in presence of two subscribing witnesses.

CHARLES M. DEPEW.
HOLLIS E. McCOY.

Witnesses:
S. H. NOURSE,
JESSIE C. BRODIE.